(12) United States Patent
Tokumaru (10) Patent No.: US 10,829,097 B2
(45) Date of Patent: Nov. 10, 2020

(54) SPEED CONTROL DEVICE

(71) Applicant: Mitsubishi Electric Corporation, Tokyo (JP)

(72) Inventor: Makoto Tokumaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 380 days.

(21) Appl. No.: 15/743,118

(22) PCT Filed: Sep. 14, 2015

(86) PCT No.: PCT/JP2015/076029
§ 371 (c)(1),
(2) Date: Jan. 9, 2018

(87) PCT Pub. No.: WO2017/046852
PCT Pub. Date: Mar. 23, 2017

(65) Prior Publication Data
US 2019/0100174 A1    Apr. 4, 2019

(51) Int. Cl.
*B60T 7/12* (2006.01)
*G05D 1/00* (2006.01)
(Continued)

(52) U.S. Cl.
CPC .............. *B60T 7/12* (2013.01); *B60T 8/17* (2013.01); *B60T 8/171* (2013.01); *B60T 8/172* (2013.01); *B60T 2250/04* (2013.01)

(58) Field of Classification Search
CPC ... B60T 7/12; B60T 8/17; B60T 8/171; B60T 8/172; B60T 2250/04; B61L 3/00; B61L 3/008; B61L 25/04

(Continued)

(56) References Cited

U.S. PATENT DOCUMENTS

2018/0327005 A1* 11/2018 Yamamoto .......... B61L 27/0038

FOREIGN PATENT DOCUMENTS

JP    06-086404 A    3/1994
JP    2002-37070 A   2/2002
(Continued)

OTHER PUBLICATIONS

Indian Office Action dated Feb. 7, 2020 issued in Indian Patent Application No. 201847006527, with English translation (5 pages).
(Continued)

*Primary Examiner* — Mahmoud S Ismail
(74) *Attorney, Agent, or Firm* — Buchanan Ingersoll & Rooney PC (57) ABSTRACT

A speed control device includes: a first calculation unit to calculate first location information and first speed information from output of a speed generator; a second calculation unit to calculate second location information and second speed information from output of a speed sensor; a route database storage unit to store information to select one of a calculation result of the first calculation unit and a calculation result of the second calculation unit in accordance with a location of a vehicle; and a selection unit to select one of the calculation results on the basis of the information of the route database storage unit to output the information as location information and speed information, in which speed of the vehicle is determined on the basis of the location information and speed information.

4 Claims, 6 Drawing Sheets

(51) Int. Cl.
    *G06F 7/00*          (2006.01)
    *G06F 17/00*        (2019.01)
    *B60T 8/171*        (2006.01)
    *B60T 8/172*        (2006.01)
    *B60T 8/17*          (2006.01)

(58) Field of Classification Search
    USPC .......................................................... 701/79
    See application file for complete search history.

(56) References Cited

FOREIGN PATENT DOCUMENTS

| | | | | |
|---|---|---|---|---|
| JP | 2002037070 | A | * | 2/2002 |
| JP | 2005-12853 | A | | 1/2005 |
| JP | 2005012853 | A | * | 1/2005 |
| JP | 2010-234979 | A | | 10/2010 |
| JP | 2013-205248 | A | | 10/2013 |
| JP | 2014-21075 | A | | 2/2014 |

OTHER PUBLICATIONS

International Search Report (PCT/ISA/210) dated Oct. 20, 2015, by the Japanese Patent Office as the International Searching Authority for International Application No. PCT/JP2015/076029.
Written Opinion (PCT/ISA/237) dated Oct. 20, 2015, by the Japanese Patent Office as the International Searching Authority for International Application No. PCT/JP2015/076029.
Japanese Office Action (Notification of Reasons for Refusal) dated Oct. 27, 2017, issued by Japanese Patent Office in corresponding Japanese Patent Application No. 2017-540363, and a computer generated English Translation of the Office Action. (6 pages).

* cited by examiner

SPEED CONTROL DEVICE

CROSS-REFERENCE TO RELATED APPLICATIONS

The present application claims priority to PCT/JP2015/076029 filed on Sep. 14, 2015, which is incorporated by reference herein in its entirety and for all purposes.

FIELD

The present invention relates to a speed control device that detects a location and speed of a train vehicle, and controls speed of the train vehicle on the basis of the location and speed detected.

BACKGROUND

In Patent Literature 1 that is an example of a conventional technology, a technology is disclosed that aims to "quickly detect a slide even when the slide occurs again immediately after re-adhesion of a wheel, in a method for detecting a slide of the wheel", and corrects a speed detection error due to the slide by using "a method that stores previous speed data (V2 . . . Vn, where n≥3) with respect to speed data V1 of current measurement time, and calculates average acceleration or deceleration on the basis of those speed data for each measurement, to detect the slide of the wheel on the basis of the average acceleration or deceleration. When it is detected that the wheel recovers from the slide and re-adhesion occurs, all the speed data at the time are replaced with the maximum speed in the speed data".

CITATION LIST

Patent Literature

Patent Literature 1: Japanese Patent Application Laid-open No. H6-86404

SUMMARY

Technical Problem

However, according to the conventional technology, because all the speed data are replaced with the maximum speed in the speed data in detecting the slide, when a slide or wheel slip occurs, the speed data are replaced with the maximum speed even though they are not actually in the maximum speed. For that reason, there has been a problem in that speed detection accuracy decreases for each time when the slide or wheel slip occurs.

The present invention has been made in view of the above, and it is an object to obtain a speed control device capable of detecting speed and location more accurately than before.

Solution to Problem

An aspect of the present invention includes: a first calculation unit to calculate first location information and first speed information from output of a speed generator; a second calculation unit to calculate second location information and second speed information from output of a speed sensor; a route database storage unit to store information to select one of a calculation result of the first calculation unit and a calculation result of the second calculation unit in accordance with a location of a vehicle; and a selection unit to select one of the calculation results on the basis of the information of the route database storage unit to output the information as location information and speed information. Speed of the vehicle is determined on the basis of the location information and speed information selected.

Advantageous Effects of Invention

According to the present invention, there is an effect that the speed and location can be detected more accurately than before.

DESCRIPTION OF EMBODIMENTS

Hereinafter, a speed control device according to embodiments of the present invention will be described in detail with reference to the drawings. Incidentally, the invention is not limited to the embodiments.

First Embodiment

Figure 1:
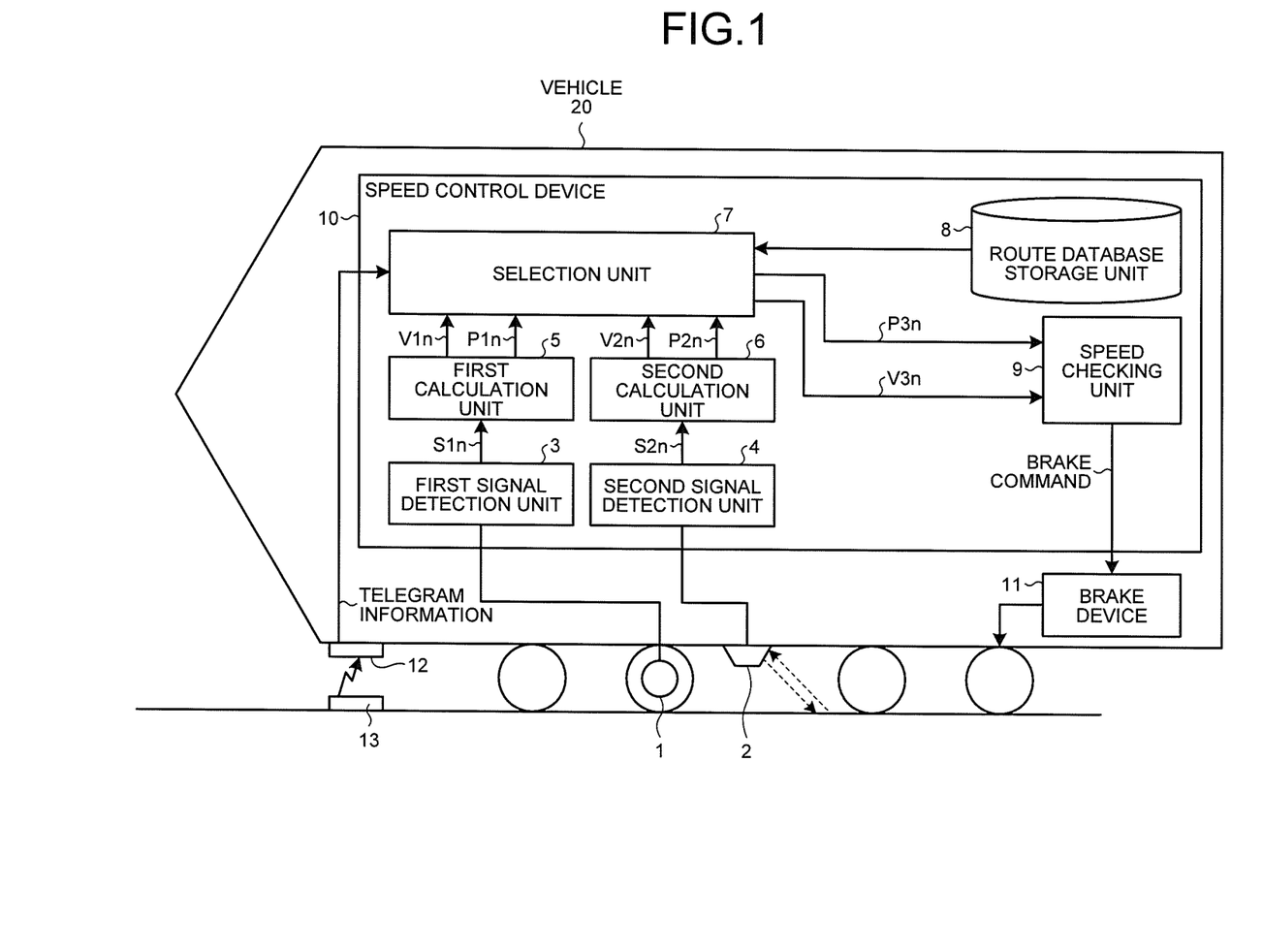
FIG. 1 is a block diagram illustrating a configuration example of a speed control device according to a first embodiment.

FIG. 1 is a block diagram illustrating a configuration example of a speed control device according to a first embodiment of the present invention. A speed control device 10 illustrated in FIG. 1 is mounted on a vehicle 20 that includes a speed generator 1 to generate and output a pulse according to the number of rotations of a wheel, and a speed sensor 2 to detect speed by reflection of an electromagnetic wave without using rotation of the wheel and output the amount of detection. The speed control device includes a first signal detection unit 3 that converts the pulse into a pulse signal S1$n$ and output the pulse signal S1$n$; a second signal detection unit 4 that converts the amount of detection into a detection signal S2$n$ and output the detection signal S2$n$; a first calculation unit 5 that receives input of the pulse signal S1$n$, and calculates and outputs first location information P1$n$ and first speed information V1$n$ of the vehicle 20; a second calculation unit 6 that receives an input of the detection signal S2$n$, and calculates and outputs second location information P2$n$ and second speed information V2$n$ of the vehicle 20; a route database storage unit 8 that stores information to select any of the first location information P1$n$, the second location information P2$n$, the first speed information V1$n$, and the second speed information V2$n$ in accordance with a location of the vehicle 20; and a selection unit 7 that receives inputs of the first location information P1n, the second location information P2n, the first speed information V1n, and the second speed information V2n, and selects any set of location information and speed information on the basis of the information of the route database storage unit 8, and outputs location information P3n and speed information V3n.

In addition, the vehicle 20 includes a speed checking unit 9 that creates a speed checking pattern, receives inputs of the location information P3n and speed information V3n selected, and outputs a brake command when the location information P3n and speed information V3n exceed does not fall within the speed checking pattern; a brake device 11 that receives an input of the brake command and performs braking of the vehicle 20; and a pickup coil 12. The information of the route database storage unit 8 is stored as a location and speed signal selection flag, for example.

Incidentally, the vehicle 20 can determine a current location using the pickup coil 12. When the pickup coil 12 passes over a ground coil 13 on a route, a ground coil ID is transmitted from the ground coil 13 to the pickup coil 12 by electromagnetic coupling or short range wireless transmission. The pickup coil 12 transmits the ground coil ID received to the selection unit 7, as telegraph information. The route database storage unit 8 stores a relationship between the ground coil ID and an absolute location, and the selection unit 7 uses a route database and the ground coil ID received to determine an absolute location of the vehicle 20. Alternatively, in a case where a data transmission capacity is large between the pickup coil 12 and the ground coil 13, the kilometrage may be transmitted from the ground coil 13 to the pickup coil 12, instead of the ground coil ID. In a case where the kilometrage can be transmitted from the ground coil 13 to the pickup coil 12, the route database storage unit 8 does not have to store a relationship between the ground coil ID and the kilometrage.

Incidentally, the speed sensor 2 is not limited to a specific sensor as far as it is a sensor capable of detecting the speed by using reflection of the electromagnetic wave without using rotation of the wheel. The speed sensor 2 includes an output unit to radiate the electromagnetic wave onto a road surface, and a detection unit to detect the electromagnetic wave reflected from the road surface. In addition, the electromagnetic wave includes a radio wave and light. The speed sensor 2 includes a Doppler sensor.

Incidentally, in a case where the first calculation unit 5 and the second calculation unit 6 are capable of being input an output of the speed generator 1, the first signal detection unit 3 and the second signal detection unit 4 are not necessary. That is, the first signal detection unit 3 and the second signal detection unit 4 are not essential constituents.

Incidentally, vehicle location information is information on the location of the vehicle, and examples of the location information include an absolute location of the vehicle, and the amount of location change of the vehicle that is information on the location of the vehicle. Vehicle speed information is information on the speed of the vehicle, and examples of the speed information include vehicle speed and vehicle acceleration.

Figure 2:
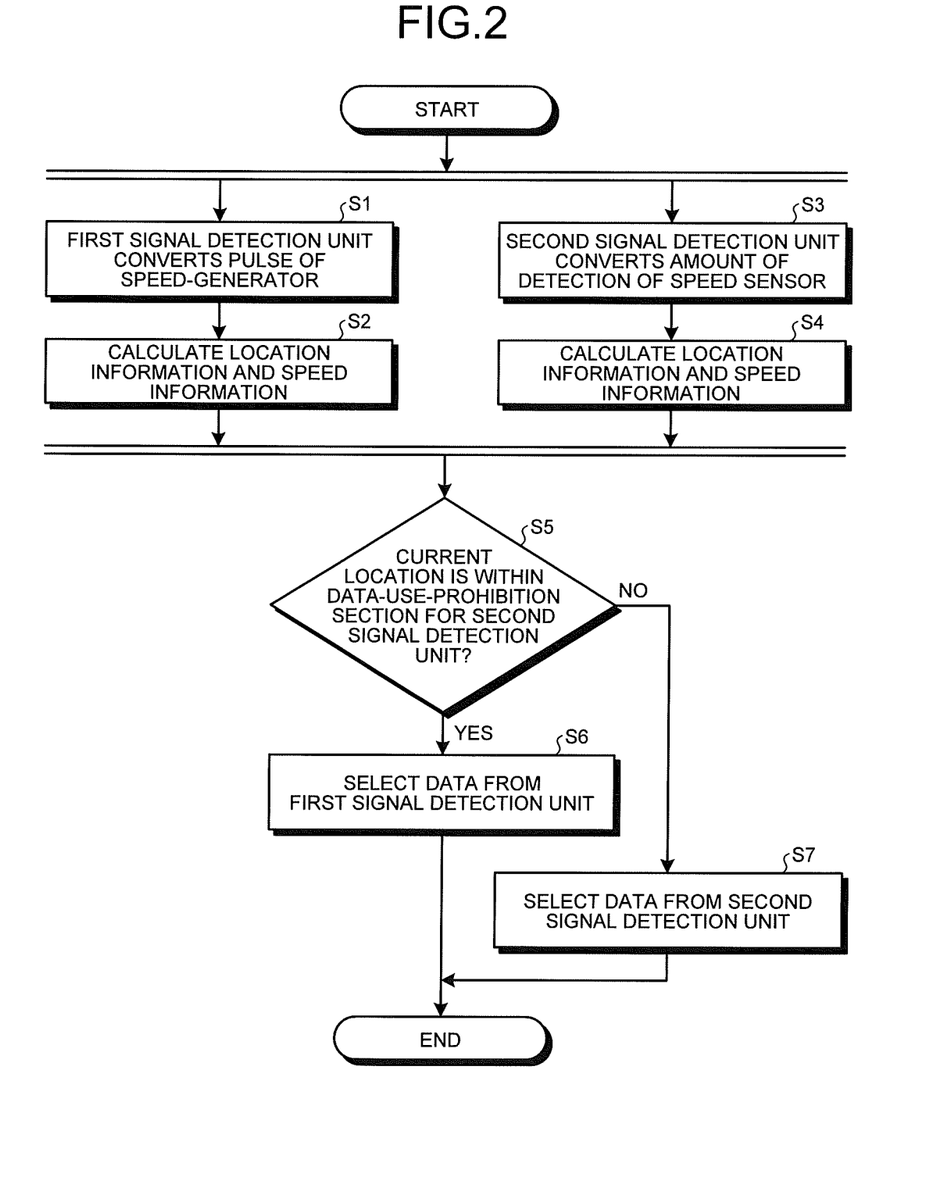
FIG. 2 is a flowchart illustrating an operation example of the speed control device according to the first embodiment.

FIG. 2 is a flowchart illustrating an operation example of the speed control device according to the first embodiment of the present invention. Incidentally, this processing is repeatedly performed at a set constant period.

First, the processing is started, and the first signal detection unit 3 converts the pulse according to the number of rotations of the wheel output by the speed generator 1 into the pulse signal S1n and outputs the pulse signal S1n (S1). The first calculation unit 5 calculates and outputs the location information P1n and speed information V1n of the vehicle 20 on the basis of the pulse signal S1n (S2). The second signal detection unit 4 converts the amount of detection output by the speed sensor 2 into the detection signal S2n and outputs the detection signal S2n (S3). The second calculation unit 6 calculates and outputs the location information P2n and speed information V2n of the vehicle 20 on the basis of the detection signal S2n (S4). Here, steps S1 and S2, and steps S3 and S4 may be performed sequentially, or may be performed in parallel.

The selection unit 7, on the basis of the route database stored in the route database storage unit 8, selects any of the set the location information P1n and speed information V1n, and the set of the location information P2n and speed information V2n, and outputs location information and speed information that are selected, as the location information P3n and speed information V3n. Here, the selection unit 7 selects location information and speed information depending on whether or not the current location of the vehicle 20 is within a data-use-prohibition section where use of data from the second signal detection unit 4 (S5) is prohibited. For such determination, the location and speed signal selection flag is used, for example. The location and speed signal selection flag indicates information to select any one of the set of the location information P1n and speed information V1n, and the set of the location information P2n and speed information V2n. For example, when the current location of the vehicle 20 is within the data-use-prohibition section where use of data from the second signal detection unit 4 is prohibited, the location and speed signal selection flag is set to "1", and when the location is outside the data-use-prohibition section where use of data from the second signal detection unit 4 is prohibited, the location and speed signal selection flag is set to "0". At this time, when the location and speed signal selection flag is "1", the current location of the vehicle 20 is within the use-prohibition section where use of data from the second signal detection unit 4 is prohibited (S5: Yes), so that the selection unit 7 selects the location information P1n and speed information V1n calculated from data of the first signal detection unit 3 (S6). On the other hand, when the location and speed signal selection flag is "0", the current location of the vehicle 20 is outside the use-prohibition section where use of data from the second signal detection unit 4 is prohibited (S5: No), so that the selection unit 7 selects the location information P2n and speed information V2n calculated from data of the second signal detection unit 4 (S7). The selection unit 7 outputs the location information and speed information selected in this way, as the location information P3n and speed information V3n, and ends the processing.

The speed checking unit 9 to which the location information P3n and speed information V3n are input, compares the speed checking pattern that the speed checking unit 9 has created with the location information P3n and speed information V3n. The speed checking unit 9, in a case where the location information P3n and speed information V3n does not fall within the speed checking pattern, outputs the brake command, and, in a case where the location information P3n and speed information V3n falls within the speed checking pattern, ends the processing without outputting the brake command. Note that, the speed checking pattern is created in accordance with a speed limit of the vehicle 20.

Figure 3:
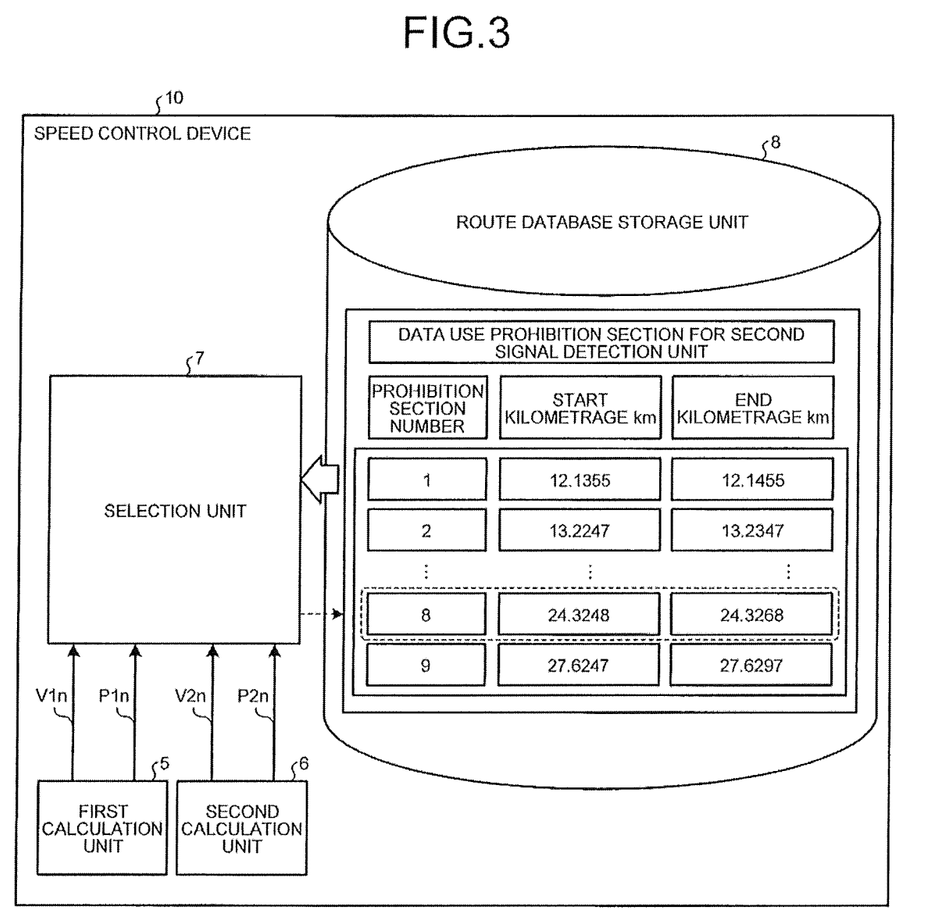
FIG. 3 is a diagram illustrating an example of a data structure of a route database storage unit in the first embodiment.

FIG. 3 is a diagram illustrating an example of a data structure of the route database storage unit 8. FIG. 3 illustrates the first calculation unit 5, the second calculation unit 6, the selection unit 7, and the route database storage unit 8. The route database storage unit 8 illustrated in FIG. 3 sequentially stores information specifying the data-use-prohibition section where use of data from the second signal detection unit 4 is prohibited. A prohibition section of a prohibition section number 1 is from a point of kilometrage 12.1355 km to a point of kilometrage 12.1455 km. A prohibition section of a prohibition section number 2 is from a point of kilometrage 13.2247 km to a point of kilometrage 13.2347 km. Prohibition sections of prohibition section numbers from 3 to 7 are omitted. A prohibition section of a prohibition section number 8 is from a point of kilometrage 24.3248 km to a point of kilometrage 24.3268 km. A prohibition section of a prohibition section number 9 is from a point of kilometrage 27.6247 km to a point of kilometrage 27.6297 km. In sections other than these prohibition sections, the selection unit 7 selects the location information P2$n$ and speed information V2$n$ that are not influenced by the slide or wheel slip, as the location information P3$n$ and speed information V3$n$. In these prohibition sections, the selection unit 7 selects the location information P1$n$ and speed information V1$n$, as the location information P3$n$ and speed information V3$n$.

Incidentally, as illustrated by a dotted line in FIG. 3, it may be configured such that, when a section in which an intensity of a reflected signal received by the sensor that uses reflection of the electromagnetic wave is equal to or less than a set threshold value and the reflection intensity is insufficient is newly found in test traveling, the selection unit 7 can register the section as a prohibition section in the route database storage unit 8, and update the route database.

For the speed information detected by the first signal detection unit 3, calibration is performed in normal traveling during which no wheel slip or slide occurs, whereby accuracy required for the speed control device 10 is secured, and the first signal detection unit 3 can detect the speed without being influenced by a structure around a rail. Note that, the accuracy required for the speed control device 10 is generally about ±5 km/h. However, in a wheel on which the brake device 11 acts and that is mounted on an axle driven by a motor, the slide may occur in braking, and the wheel slip may occur in power running. When the wheel slip or slide occurs in this way, there is a possibility in that speed information detection accuracy decreases and a large error occurs with respect to a target value.

On the other hand, the speed information V2$n$ detected by a sensor that does not use rotation of the wheel, for example, the Doppler sensor, is not influenced by the wheel slip and slide, so that accuracy above a certain level is guaranteed in both braking and power running. However, because such a sensor uses reflection of the electromagnetic wave, the intensity of the reflected wave may be insufficient depending on the structure between rails or around the rails, and accuracy of the speed information may not be guaranteed. The route database storage unit 8 stores in advance information on a place where it is difficult for the sensor, which uses reflection of the electromagnetic wave without using rotation of the wheel, to perform accurate detection. Examples of the places where it is difficult for the sensor that uses reflection of the electromagnetic wave to perform accurate detection include a railroad bridge where no reflected wave can be obtained since there is no structure under the rail, and a sharp curve where an irradiation position largely deviates from the rail.

Therefore, according to the present embodiment, the speed generator and the sensor using reflection of the electromagnetic wave are used in combination. In a place where the sensor that uses reflection of the electromagnetic wave can perform accurate detection, a detection result of the sensor that uses reflection of the electromagnetic wave and is not influenced by the wheel slip and slide is used whereas in a place where it is difficult for the sensor that uses reflection of the electromagnetic wave cannot perform accurate detection, a detection result of the speed generator is used, whereby the two sensors can be used complementarily. Accordingly, influence of the wheel slip and slide and influence due to a rail installation environment to reflection of the electromagnetic wave, with respect to the location information and speed information, can be eliminated as much as possible. For that reason, there is an effect in that the speed and location can be detected more accurately than in the past.

Second Embodiment

Figure 4:
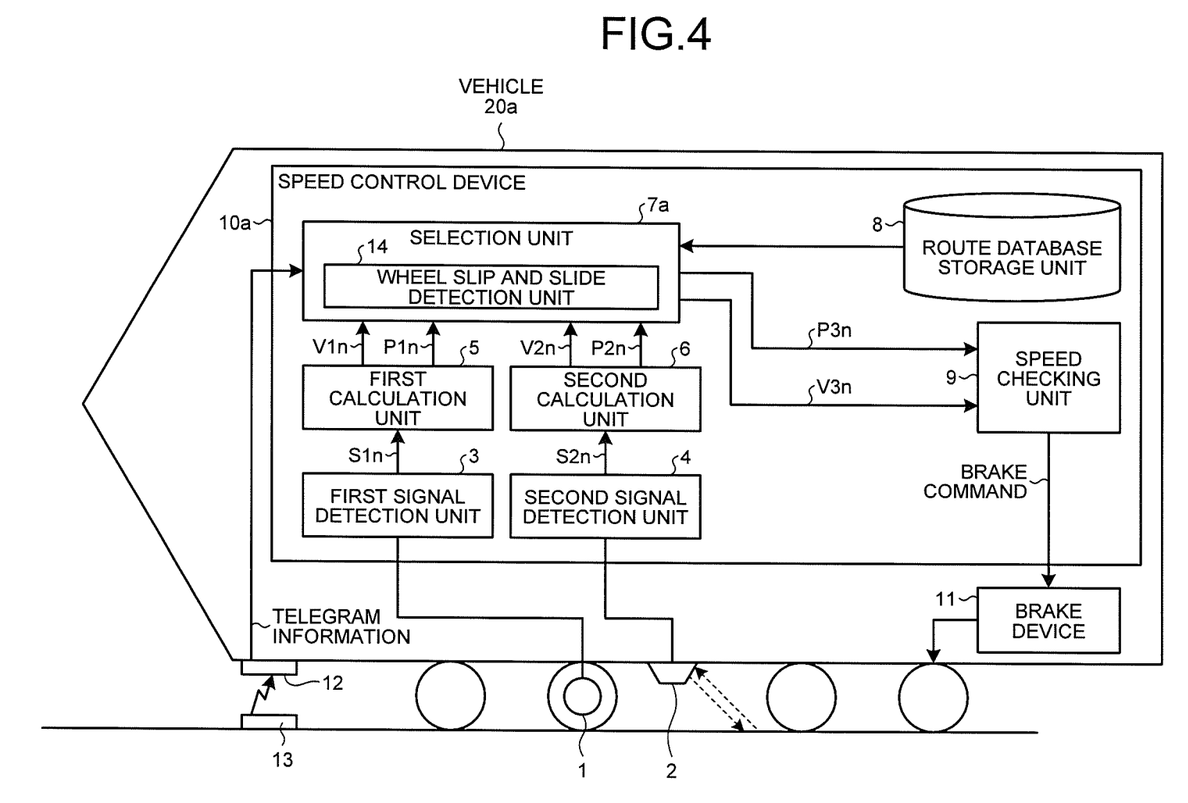
FIG. 4 is a block diagram illustrating a configuration example of a speed control device according to a second embodiment.

FIG. 4 is a block diagram illustrating a configuration example of a speed control device according to a second embodiment of the present invention. A speed control device 10$a$ illustrated in FIG. 4 is different from the speed control device 10 illustrated in FIG. 1 in that a selection unit 7$a$ is included instead of the selection unit 7. The selection unit 7$a$ includes a wheel slip and slide detection unit 14.

Figure 5:
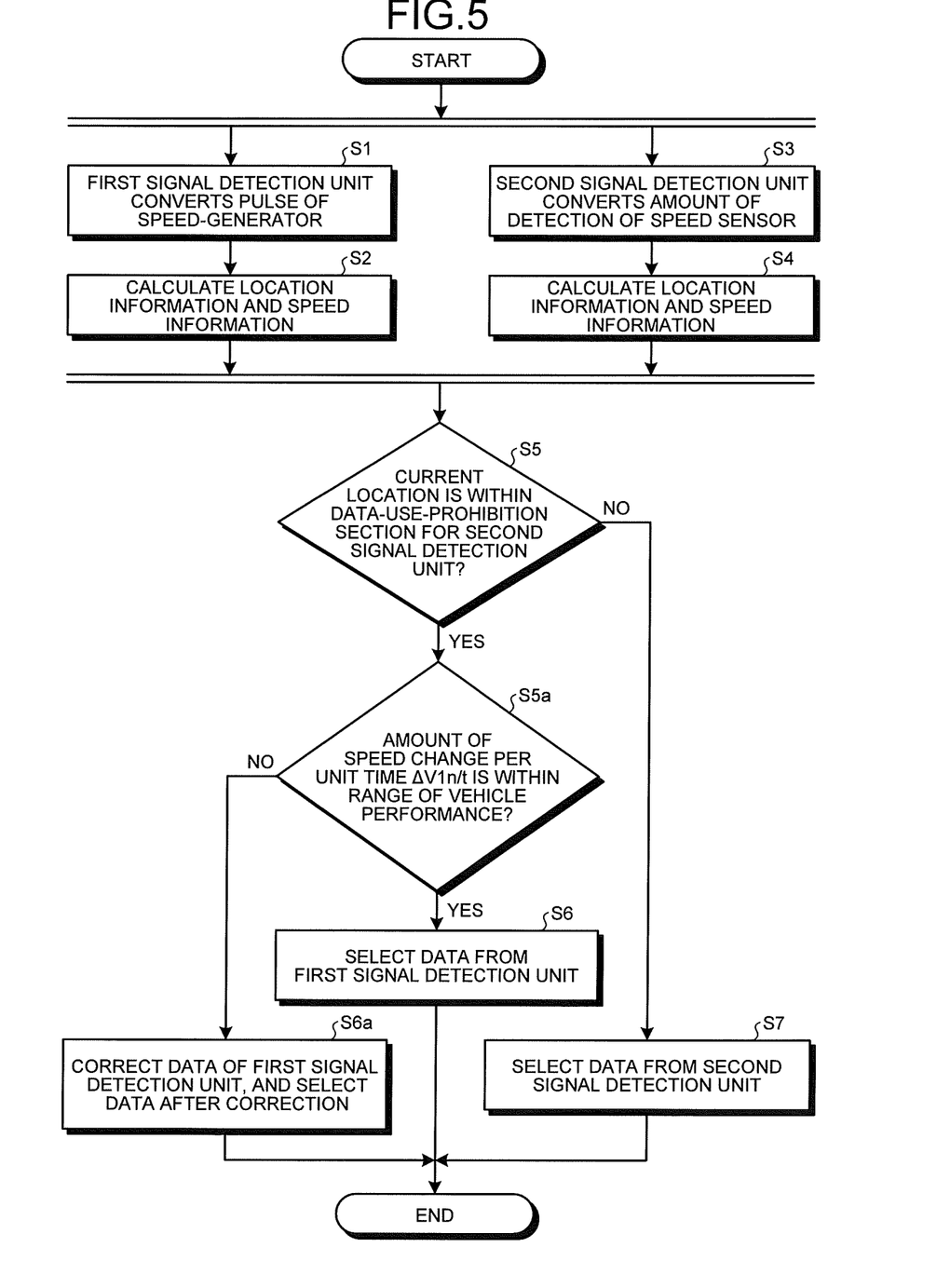
FIG. 5 is a flowchart illustrating an operation example of the speed control device according to the second embodiment.

FIG. 5 is a flowchart illustrating an operation example of the speed control device according to the second embodiment of the present invention. The flowchart illustrated in FIG. 5 is the same as the flowchart illustrated in FIG. 2 up to step S5. When the location and speed signal selection flag is "1", the current location of a vehicle 20$a$ is within the prohibition section where use of data from the second signal detection unit 4 (S5: Yes) is prohibited, so that it is determined whether or not an amount of speed change per unit time $\Delta V1n/t$ is within a range of vehicle performance (S5$a$). That is, a vehicle's maximum deceleration $\beta$max that is a negative value and a vehicle's maximum acceleration $\alpha$max that is a positive value are used, and it is determined whether or not $\beta$max$<\Delta V1n/t<\alpha$max falls true. Here, the vehicle performance is determined by a maximum value of an absolute value of acceleration/deceleration allowed for the vehicle 20$a$. In a case where $\beta$max$<\Delta V1n/t<\alpha$max and the amount of speed change per unit time is within the range of the vehicle performance (S5$a$: Yes), the acceleration/deceleration is normal, so that the selection unit 7$a$ selects the location information P1$n$ and speed information V1$n$ that are based on the data from the first signal detection unit 3 (S6). In a case where V1$n/t<\beta$max or $\alpha$max$<\Delta V1n/t$ and the amount of speed change per unit time is outside the range of the vehicle performance (S5$a$: No), the acceleration/deceleration is abnormal, so that the selection unit 7$a$ corrects the location information P1$n$ and speed information V1$n$ that are based on the data from the first signal detection unit 3, and selects the data after correction (S6$a$). Here, abnormality of the acceleration/deceleration is caused by the wheel slip and slide, so that the wheel slip and slide detection unit 14 detects slip and slide. In addition, a minimum value or a maximum value of a normal value is used for correction. That is, when $\Delta V1n/t<\beta$max falls true, correction is made using $\beta$max, and when $\alpha$max$<\Delta V1n/t$ falls true, correction is made using $\alpha$max. The selection unit 7$a$ outputs the location information and speed information that are selected in this way, as the location information P3$n$ and speed information V3$n$, and ends the processing.

As described above, in the present embodiment, although the maximum value and the minimum value of the acceleration/deceleration are used to perform correction, the speed generator and the sensor using reflection of the electromagnetic wave are used in combination, and data of the sensor that uses reflection of the electromagnetic wave is used in sections other than sections where use of data of the sensor that uses reflection of the electromagnetic wave is prohibited. Accordingly, frequency for correction due to the wheel slip and slide is less than the frequency in the conventional technology, and decrease in speed detection accuracy can be minimized.

According to the present embodiment, in addition to the effect of the first embodiment, the wheel slip and slide can be detected, and in a case where the wheel slip or slide occurs, the speed and location can be detected with high accuracy by performing minimum correction.

Figure 6:
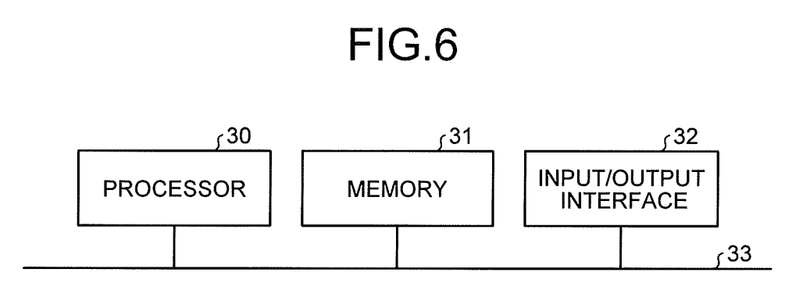
FIG. 6 is a diagram illustrating a general configuration of hardware to realize the device in the first and second embodiments.

Incidentally, in the first and second embodiments, the configuration of the first calculation unit 5, the second calculation unit 6, the selection unit 7 or the selection unit 7a, and the route database storage unit 8 can be realized by including at least a processor, a memory, and an input/output interface, and the operation can be realized by software. FIG. 6 is a diagram illustrating a general configuration of hardware to realize such a device. The device illustrated in FIG. 6 includes a processor 30, a memory 31 and an input/output interface 32 connected by a bus 33. The processor 30 uses input data to perform calculation and control with software. The memory 31 stores the input data or data necessary for the processor 30 to perform the calculation and control. The input/output interface 32 receives at least the pulse signal S1*n* from the first signal detection unit 3 and the detection signal S2*n* from the second signal detection unit 4, and transmits the location information P3*n* and speed information V3*n* selected by the processor 30 to the speed checking unit 9. Note that, each of the processor 30 and the memory 31 may be provided for more than one.

The configurations described in the above embodiments describe examples of content of the present invention, and can be combined with other known techniques, and also part of the configuration can be omitted or modified without departing from the gist of the present invention.

REFERENCE SIGNS LIST

1 speed generator; 2 speed sensor; 3 first signal detection unit; 4 second signal detection unit; 5 first calculation unit; 6 second calculation unit; 7, 7a selection unit; 8 route database storage unit; 9 speed checking unit; 10, 10a speed control device; 11 brake device; 12 pickup coil; 13 ground coil; 14 wheel slip and slide detection unit; 20, 20a vehicle; 30 processor; memory; 32 input/output interface; 33 bus.

The invention claimed is:

1. A speed control device mounted on a vehicle that includes a speed generator to generate and output a pulse according to a number of rotations of a wheel, and a speed sensor to detect speed using reflection of an electromagnetic wave without using rotation of the wheel and output an amount of detection, the speed control device comprising:

a processor to execute a program; and
a memory to store a route database and the program which, when executed by the processor, performs processes of,
receiving an input of a pulse signal that is based on an output of the speed generator, and calculating and outputting first location information and first speed information of the vehicle;
receiving an input of a detection signal that is based on an output of the speed sensor, calculating and outputting second location information and second speed information of the vehicle;
receiving inputs of the first location information, the second location information, the first speed information, and the second speed information,
determining an absolute location of the vehicle using information from a ground coil received by a pickup coil coupled to the vehicle,
based on the absolute location of the vehicle and information of a route database, determining whether to select (a) the first location information and the first speed information or (b) the second location information and the second speed information,
based on the determining, selecting either (a) the first location information and the first speed information or (b) the second location information and the second speed information, and
determining speed of the vehicle on a basis of the selected one of (a) the first location information and the first speed information or (b) the second location information and the second speed information.

2. The speed control device according to claim 1, wherein the information of the route database includes information specifying a use-prohibition section where use of the second location information and the second speed information is prohibited, and
the selecting includes:
selecting the first location information and the first speed information in the use-prohibition section, and
selecting the second location information and the second speed information in a section other than the use-prohibition section.

3. The speed control device according to claim 1, wherein the selecting further includes a wheel slip and slide detection, and
when a slide or wheel slip is detected, the selecting further includes correcting the first location information and the first speed information, and outputting corrected values as the location information and speed information that are selected.

4. The speed control device according to claim 1, wherein the output of the speed sensor is based on a reflection of the electromagnetic wave off of a road surface underneath the vehicle.

\* \* \* \* \*